United States Patent
Elias et al.

(10) Patent No.: US 10,877,557 B2
(45) Date of Patent: Dec. 29, 2020

(54) IMU-BASED GLOVE

(71) Applicant: Apple Inc., Cupertino, CA (US)

(72) Inventors: John Greer Elias, Townsend, DE (US);
Andrew D. Sterian, Morgan Hill, CA (US); Anuranjini Pragada, San Jose, CA (US); Daniel D. Sunshine, Austin, TX (US); Jean Hsiang-Chun Lu, Sunnyvale, CA (US); Lia Mieko Uesato, San Jose, CA (US); Storrs Townsend Hoen, Brisbane, CA (US); Zebinah P. Masse, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/115,367

(22) Filed: Aug. 28, 2018

(65) Prior Publication Data

US 2019/0101981 A1 Apr. 4, 2019

Related U.S. Application Data

(60) Provisional application No. 62/566,303, filed on Sep. 29, 2017.

(51) Int. Cl.
*G06F 3/01* (2006.01)
*A63F 13/211* (2014.01)
(Continued)

(52) U.S. Cl.
CPC .............. *G06F 3/014* (2013.01); *A41D 1/005* (2013.01); *A41D 19/00* (2013.01); *A63F 13/211* (2014.09);
(Continued)

(58) Field of Classification Search
CPC .......... G06F 3/014; G06F 3/011; G06F 3/016; A41D 1/005; A41D 2500/10; A41D 19/00;
(Continued)

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

CN 101351764 A 1/2009
CN 101611316 A 12/2009
(Continued)

OTHER PUBLICATIONS

International Search Report dated Feb. 28, 2019, for PCT/US2018/048398, filed Aug. 28, 2018, nine pages.
(Continued)

*Primary Examiner* — Ryan A Lubit
(74) *Attorney, Agent, or Firm* — Kubota & Basol LLP

(57) ABSTRACT

This disclosure relates to a VR glove capable of measuring the movement of individual finger and thumb bones. The VR glove can include a plurality of inertial measurement units (IMUs) to track the movement of one or more finger and/or hand sections. The IMUs can include one or more motion sensors, such as a gyroscope and an accelerometer, for measuring the orientation, position, and velocity of objects (e.g., finger bones) that the IMU can be attached. An IMU can be located proximate to a finger (or thumb) bone and can measure the inertial motion of the corresponding bone. In some examples, the VR glove may include magnetometers to determine the direction of the geo-magnetic field. The VR glove can also include one or more other electronic components, such as a plurality of electrodes for sensing the heading, enabling capacitive touch, and/or contact sensing between finger tips.

15 Claims, 9 Drawing Sheets

(51) Int. Cl.
*A41D 1/00* (2018.01)
*A41D 19/00* (2006.01)
*D04B 1/28* (2006.01)
*D04B 21/20* (2006.01)
*G09B 5/02* (2006.01)

(52) U.S. Cl.
CPC ............. *D04B 1/28* (2013.01); *D04B 21/207* (2013.01); *G06F 3/011* (2013.01); *G06F 3/016* (2013.01); *G09B 5/02* (2013.01); *A41D 2500/10* (2013.01); *D10B 2401/16* (2013.01); *D10B 2501/041* (2013.01)

(58) Field of Classification Search
CPC .... D04B 1/28; D04B 21/207; D10B 2401/16; D10B 2501/041
See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 9,665,174 B2 | 5/2017 | Osman | |
| 2006/0115348 A1* | 6/2006 | Kramer | B25J 13/025 414/5 |
| 2006/0197753 A1 | 9/2006 | Hotelling | |
| 2007/0063992 A1* | 3/2007 | Lundquist | G06F 3/0219 345/174 |
| 2014/0198035 A1 | 7/2014 | Bailey et al. | |
| 2014/0215684 A1* | 8/2014 | Hardy | A41D 19/0031 2/160 |
| 2015/0358543 A1 | 12/2015 | Kord | |
| 2016/0187973 A1* | 6/2016 | Shankar | G09G 5/18 345/156 |
| 2016/0187974 A1* | 6/2016 | Mallinson | A63F 13/5255 463/32 |
| 2016/0246370 A1 | 8/2016 | Osman | |
| 2016/0313798 A1* | 10/2016 | Connor | A61B 5/0488 |
| 2016/0338644 A1 | 11/2016 | Connor | |
| 2017/0090568 A1 | 3/2017 | Chen et al. | |
| 2017/0212589 A1 | 7/2017 | Domenikos | |
| 2017/0228095 A1* | 8/2017 | Domaradzki | G06F 3/048 |
| 2017/0262060 A1* | 9/2017 | Katsuki | G06F 3/038 |
| 2017/0316765 A1* | 11/2017 | Louhivuori | G10H 1/0008 |
| 2018/0074593 A1* | 3/2018 | Dibbur | G06F 3/014 |
| 2019/0021924 A1* | 1/2019 | Trepanier | A61H 1/005 |
| 2019/0265017 A1 | 8/2019 | Guo et al. | |
| 2020/0112646 A1 | 4/2020 | Tanaka | |
| 2020/0142490 A1 | 5/2020 | Xiong et al. | |

FOREIGN PATENT DOCUMENTS

| | | |
|---|---|---|
| CN | 102188246 A | 9/2011 |
| CN | 103718057 A | 4/2014 |
| CN | 104281261 A | 1/2015 |
| CN | 105353866 A | 2/2016 |
| CN | 205540575 U | 8/2016 |
| CN | 106174813 A | 12/2016 |
| CN | 206248100 U | 6/2017 |
| CN | 107533369 A | 1/2018 |
| EP | 3208687 A1 | 8/2017 |
| JP | 2000-163031 A | 6/2000 |
| JP | 2002-342033 A | 11/2002 |
| RU | 179 301 U | 5/2018 |
| WO | WO_2016097841 A2 | 6/2016 |
| WO | 2019067144 A1 | 4/2019 |

OTHER PUBLICATIONS

Connolly, J. et al. (Feb. 1, 2018). "IMU Sensor-Based Electronic Goniometric Glove for Clinical Finger Movement Analysis," IEEE Sensor Journal, vol. 18, No. 3, nine pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Office Action received for Chinese Patent Application No. 201921033589.X, dated Apr. 26, 2020, 7 pages (5 pages of English Translation and 2 pages of Official Copy).
International Search Report and Written Opinion received for PCT Patent Application No. PCT/US2018/048398, dated Feb. 28, 2019, 22 pages.
International Search Report and Written Opinion received for PCT Patent Application No. PCT/US2019/019041, dated May 22, 2019, 12 pages.
Office Action received for Chinese Patent Application No. 201921033589.X, dated Dec. 9, 2019, 4 pages (2 pages of English Translation and 2 pages of Official Copy).
Utility Model Patentability Evaluation Report received for Chinese Patent Application No. 201821431418.8, dated Aug. 27, 2019, 14 pages (8 pages of English translation and 6 pages of Official copy).
Non-Final Office Action received for U.S. Appl. No. 16/279,588, dated Jun. 12, 2020, 8 pages.

* cited by examiner

IMU-BASED GLOVE

CROSS REFERENCE TO RELATED APPLICATIONS

This application claims benefit of U.S. Provisional Patent Application No. 62/566,303, filed Sep. 29, 2017, the entire disclosure of which is incorporated herein by reference for all purposes.

FIELD OF THE DISCLOSURE

This relates to a glove capable of measuring the movement of individual finger and thumb bones.

BACKGROUND OF THE DISCLOSURE

Virtual reality (VR) technology can be used for many applications such as military training, educational learning, and video games. VR technology can use one or more electronic devices to simulate a virtual environment and the user's physical presence in that virtual environment. One type of VR technology is augmented reality (AR) technology, where the user's real environment can be supplemented with computer-generated objects or content. Another type of VR technology is mixed reality (MR) technology, where the user's real environment and the virtual environment can be blended together.

VR/AR/MR technology can be simulated using one or more electronic devices. One electronic device can be a VR headset, where the user can use the VR headset to see the simulated virtual environment. As the user moves his or her head to look around, a display included in the headset can update to reflect the user's head movement. Another electronic device can include one or more cameras. The one or more cameras can be used to capture the user's real environment in AR technology and/or can be used for positional tracking. Yet another electronic device can include VR gloves. VR gloves can be worn over the user's hands and can allow the user to touch, feel, and hold virtual objects in real-time. VR gloves capable of accurately detecting the positions and motions of the user's hands and fingers without occlusion may be desired.

SUMMARY OF THE DISCLOSURE

This disclosure relates to a VR glove capable of measuring the movement of individual finger and thumb bones. The VR glove can include a plurality of inertial measurement units (IMUs) to track the movement of one or more finger and/or hand sections. The IMUs can include one or more motion sensors, such as a gyroscope and an accelerometer, for measuring the orientation, position, and velocity of objects (e.g., finger bones) that the IMU can be attached. An IMU can be located proximate to a finger (or thumb) bone and can measure the inertial motion of the corresponding bone. In some examples, the VR glove may include magnetometers to determine the direction of the geo-magnetic field. The VR glove can also include one or more other electronic components, such as a plurality of electrodes for sensing the heading, enabling capacitive touch, and/or contact sensing between finger tips. The VR glove can also include force sensors, actuators for haptic feedback, temperature sensors, and heaters. The VR glove can further include logic such as an on-board controller, a connector, a transceiver, a battery, and the like. One or more buses can be used to carry signals between the electronic components to, e.g., the on-hand controller. The VR glove can be a fabric glove where one or more (e.g., all) electronics components can be knitted or woven into the glove. In some examples, the fabric can be stitched together using conductive threads. Examples of the disclosure can further include detecting movement of the glove without using magnetometers by comparing the motion detected by the IMUs with local frame(s). Heading initialization can include rotation optimizers, and heading correction can include detecting irregularities (e.g., collision, rotations, etc.) of the nodes associated with the IMUs.

DETAILED DESCRIPTION

Figure 1:
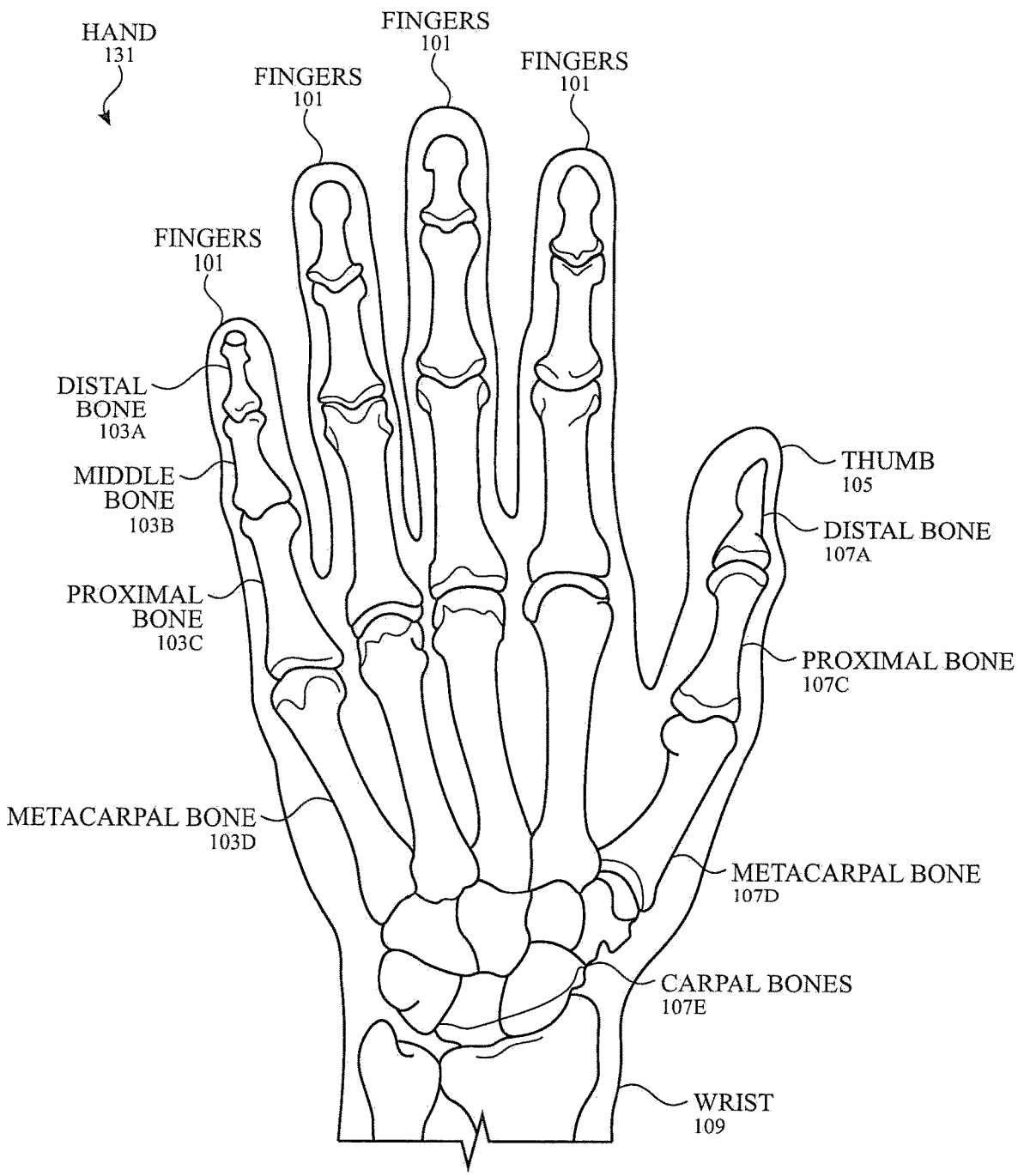
FIG. 1 illustrates an exemplary model of a human hand according to examples of the disclosure.

In the following description of examples, reference is made to the accompanying drawings in which it is shown by way of illustration specific examples that can be practiced. It is to be understood that other examples can be used and structural changes can be made without departing from the scope of the various examples.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one-step is described after the other step). Moreover, the illustration of a process by its depiction in a drawing does not imply that the illustrated process is exclusive of other variations and modification thereto, does not imply that the illustrated process or any of its steps are necessary to one or more of the examples, and does not imply that the illustrated process is preferred.

Virtual reality (VR) technology can be used for many applications such as military training, educational learning, and video games. VR technology can use one or more electronic devices to simulate a virtual environment and the user's physical presence in that virtual environment. One type of VR technology is augmented reality (AR) technology, where the user's real environment can be supplemented with computer-generated objects or content. Another type of VR technology is mixed reality (MR) technology, where the user's real environment and the virtual environment can be blended together.

VR/AR/MR technology can be simulated using one or more electronic devices. One electronic device can be a VR headset, where the user can use the VR headset to see the simulated virtual environment. As the user moves his or her head to look around, a display included in the headset can update to reflect the user's head movement. Another electronic device can include one or more cameras. The one or more cameras can be used to capture the user's real environment in AR technology and/or can be used for positional tracking. Yet another electronic device can include VR gloves. VR gloves can be worn over the user's hands and can allow the user to touch, feel, and hold virtual objects in real-time. The VR gloves can also be used to interact with virtual surfaces, communicate inputs using gestures, display expressive emotions in interactions with other (e.g., virtual) participants, and the like. VR gloves capable of accurately detecting the positions and motions of the user's hands and fingers without occlusion may be desired. The VR gloves can also be used to interact with objects in the real environment, though those objects may be modified when displayed in the VR headset, for example.

This disclosure relates to a VR glove capable of measuring the movement of individual finger and thumb bones. The VR glove can include a plurality of IMUs to track the movement of one or more finger and/or hand sections. An IMU can be located proximate to a finger (or thumb) bone and can measure the inertial motion of the corresponding bone. In some examples, the VR glove may include magnetometers to determine the direction of the geo-magnetic field. The VR glove can also include one or more other electronic components, such as a plurality of electrodes for sensing the heading, enabling capacitive touch, and/or contact sensing between finger tips. The VR glove can also include force sensors, actuators for haptic feedback, temperature sensors, and heaters. The VR glove can further include logic such as an on-board controller, a connector, a transceiver, a battery, and the like. One or more buses can be used to carry signals between the electronic components to, e.g., the on-hand (also referred to as "on-glove") controller. The VR glove can be a fabric glove where one or more (e.g., all) electronics components can be knitted or woven into the glove. In some examples, the fabric can be stitched together using conductive threads. Examples of the disclosure can further include detecting movement of the glove without using magnetometers by comparing the motion detected by the IMUs with local frame(s). Heading initialization can include rotation optimizers, and heading correction can include detecting irregularities (e.g., collision, rotations, etc.) of the nodes associated with the IMUs.

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. In other instances, well-known process steps have been described in detail in order to avoid unnecessarily obscuring the described examples. Other applications are possible, such that the following examples should not be taken as limiting.

An exemplary VR system can include a VR headset, a host device, and VR gloves. The VR headset and the VR gloves can be attached to a user. The VR headset can be positioned such that at least its display is positioned in front of the eyes of the user. The VR headset can be configured to display the simulated virtual environment to the user. As the user moves his or her head to look around, a display included in the VR headset can update to reflect the user's head movement. For example, if the user moves his or her head down, the display can show the ground to the user. The host device can include an electronic device such as a personal computer, a mobile telephone, and/or a wearable device. The host device can communicate with one or more components included in the VR system. For example, the host device can store one or more environments (e.g., the room of the simulated environment that the user is located in) and can transmit the information about the environment to the VR headset.

The VR gloves can be worn over the hands of the user and can track the motion (e.g., positions and velocities) of the user's hands and fingers. In some instances, the VR gloves can allow the user to touch, feel, and hold virtual objects in real-time. In some examples, one or more functions and features of the VR gloves can allow the user to interact with the simulated virtual environment in the absence of cameras and with reduced occlusion. The VR gloves can also communicate with one or more other components (e.g., the host device) in the system. For example, the host device can store one or more properties of control objects (e.g., a coffee mug) and can transmit information (e.g., the shape, location, feel, etc.) about the control object to the VR gloves.

FIG. 1 illustrates an exemplary model of a human hand according to examples of the disclosure. The human hand 131 can have 27 degrees of freedom. Each of the four fingers 101 can have four degrees of freedom due to joints located between the distal bone 103A, the middle bone 103B, the proximal bone 103C that can allow for flexion or extension. Each of the four fingers 101 also has a joint associated with the metacarpal bone 103D that can allow for abduction or adduction. The thumb 105 can have five degrees of freedom due to a joint located between the distal bone 107A and the proximal bone 107C that can allow for flexion or extension. A joint located between the proximal bone 107C and the metacarpal bone 107D on the thumb 105 can allow for flexion (or extension) and abduction (or adduction). Additionally, a joint located between the metacarpal bone 107D on the thumb 105 and the carpal bones 107E can allow for flexion (or extension) and abduction (or adduction). Furthermore, the wrist 109 can have six degrees of freedom, where the user's wrist movement can include flexion or extension, abduction or adduction, and supination or pronation. A VR glove capable of tracking the hand's multiple degrees of freedom may be desirable.

Overview of the VR Glove

Figure 2:
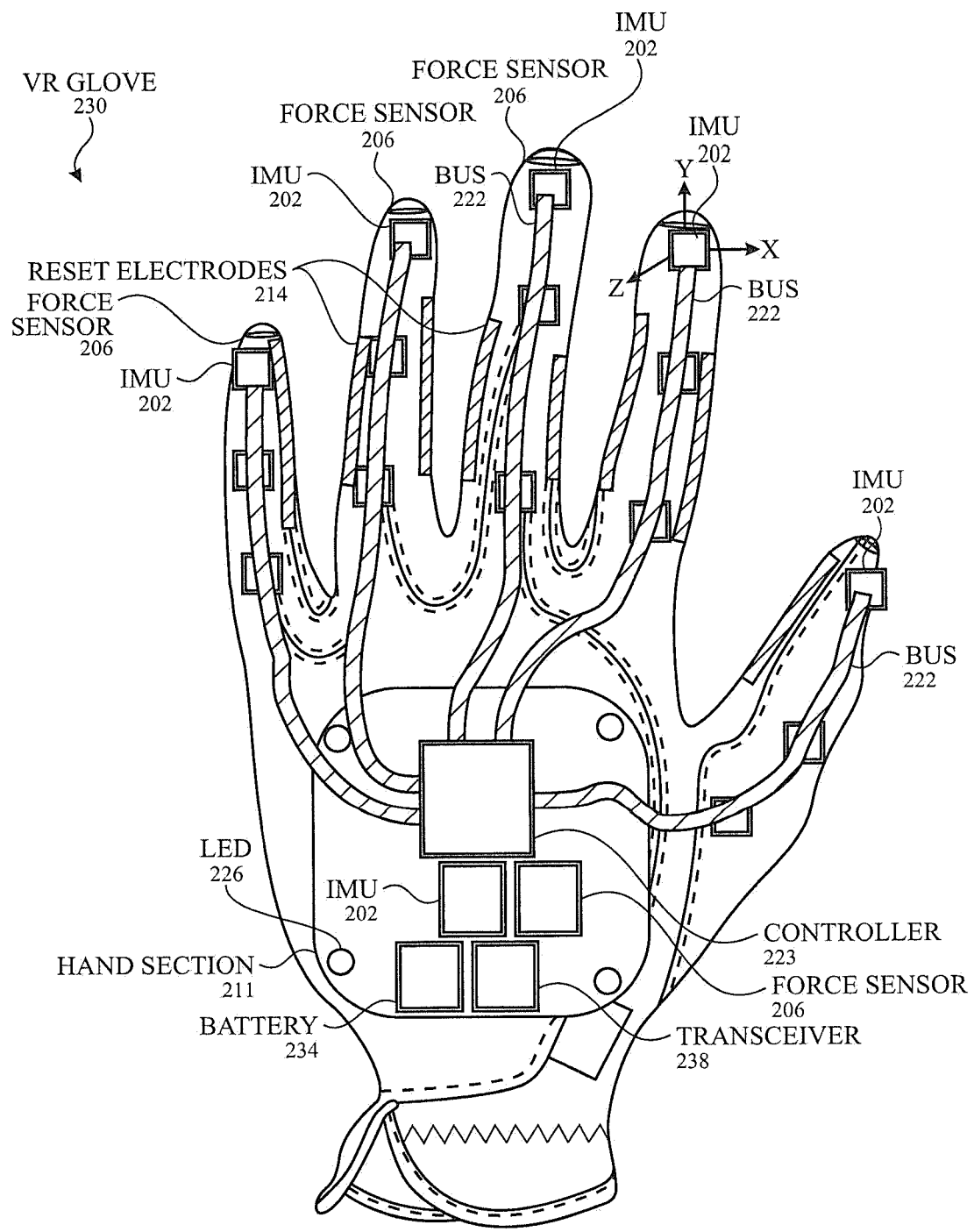
FIG. 2 illustrates a back view of an exemplary VR glove according to examples of the disclosure.

FIG. 2 illustrates a back view of an exemplary VR glove according to examples of the disclosure. The VR glove 230 can be worn over the user's hand such that one or more sections of the controller 223 can be located proximate to the back of the user's hand. That is, the back view of FIG. 2 can be a view of the user's dorsal side of his or her hand. In some instances, one or more sections of the controller can be located proximate to the user's palm. The VR glove 230 can include a plurality of electronic components, where some or all of the electronic components can be knitted or woven into the material of the VR glove 230. The electronic components can include one or more of a plurality of inertial measurement units (IMUs) 202, a plurality of force sensors 206, a plurality of haptic units (not shown), a plurality of reset electrodes 214, a controller 223, a plurality of buses 222, one or more LEDs 226, a battery 234, and a transceiver 238. Although the figure illustrates electronic components located proximate to the back of the user's hand, examples of the disclosure can include one or more components (e.g., the battery 234) located proximate to the user's wrist or other locations. For example, the battery 234 can be mounted on top of an enclosure on top of the controller 223 (not shown).

The IMUs 202 can be configured to measure the acceleration and the rotational rate of the user's bone in order to capture the motion of the user's hand and/or fingers. The plurality of force sensors 206 can be configured to measure the force applied to the user's fingers. The plurality of haptic units (not shown) can be configured to recreate the sense of touch by way of simulating vibrations and/or force. The plurality of reset electrodes 214 can be used in conjunction with a reset and/or calibration procedure to sense the heading (discussed below), to enable capacitive touch, and/or to provide contact data between the fingers. The controller 223 can include logic configured to communicate with the electronic components via the plurality of buses 222. The LED(s) 226 can be configured to provide optical feedback to the user. The battery 234 can be configured to provide power to the electronic components. The transceiver 238 can be configured to communicate with an external device (e.g., the VR headset and/or the host device).

Although not illustrated in the figure, examples of the disclosure can include one or more temperature sensors to determine the temperature of the environment and/or the temperature of the user. In some examples, one or more IMUs can include a temperature sensor. Examples of the disclosure can further include one or more heaters to simulate temperature (e.g., the user grabbing a hot coffee mug). In some examples, the VR glove 230 can include one or more electrodes (not shown) located at the fingertips. These electrodes can be used for touch input with a touch sensitive (e.g., capacitive) device.

The VR glove 230 can be capable of fine-level motion capture. That is, the VR glove 230 can be capable of discerning between the movement of an entire finger (e.g., the user waiving his or her index finger) and the movement of a finger joint (e.g., the user bending the index finger), for example. Although not show in the figure, the other side (e.g., palmar side) of the VR glove 230 can include one or more electronic components (e.g., IMUs, haptics, force sensors, and the like). The features and functionalities of the electronic components included in the VR glove 230 will be discussed in detail below.

Figure 3:
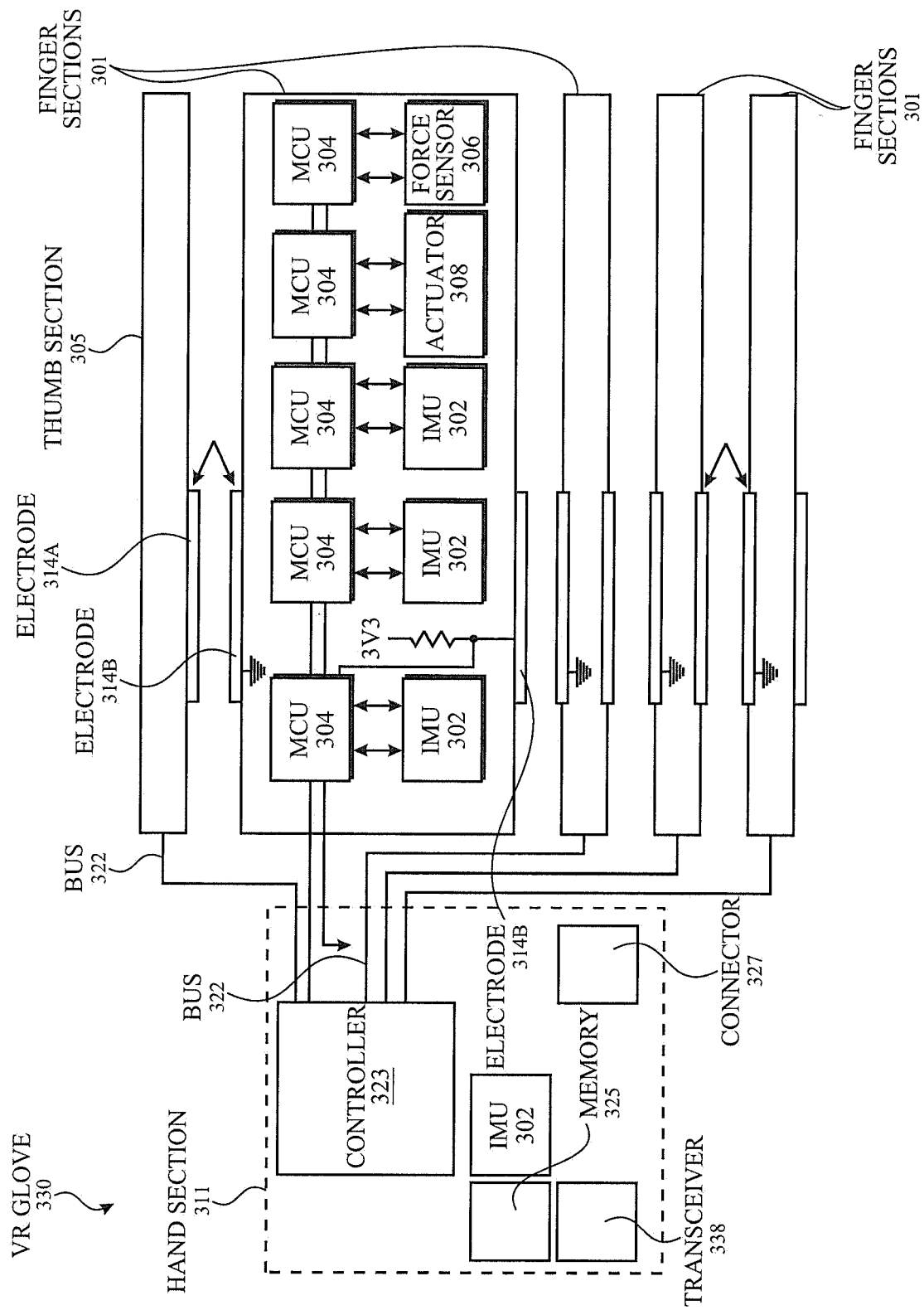
FIG. 3 illustrates a block diagram of an exemplary VR glove according to examples of the disclosure.

FIG. 3 illustrates a block diagram of an exemplary VR glove according to examples of the disclosure. The VR glove 330 can include a plurality of finger sections 301 and a hand section 311. The finger sections 301 can be located proximate to one or more of the user's fingers (e.g., fingers 101 illustrated in FIG. 1) such as the index finger, middle finger, ring finger, and pinky finger. The thumb section 305 can be located proximate to the user's thumb (e.g., thumb 105 illustrated in FIG. 1).

Motion Capture

The VR glove 330 can include a plurality of IMUs (e.g., IMUs 302 illustrated in FIG. 3) to track the movement of one or more finger and/or hand sections. One or more (e.g., each) finger sections 301 can include a plurality of IMUs 302. An IMU 302 can be located proximate to a finger bone (e.g., distal bone 103A illustrated in FIG. 1). In some examples, one or more (e.g., each) IMUs 302 can be coupled to a microcontroller unit (MCU) 304. The IMU 302 can measure inertial motion (e.g., acceleration and rotational rate) of the corresponding finger or thumb bone and can communicate the information to the MCU 304. The MCU 304 can process the information and/or communicate the information to a controller 323. In some examples, each IMU 302 can be coupled to a unique MCU 304. In some examples, multiple IMUs 302 can be coupled to a single MCU 304. As shown in the figure, examples of the disclosure can include one IMU 302 and one MCU 304 configured to measure the inertial motion of one finger bone (e.g., the proximal bone 103C illustrated in FIG. 1). In some examples, each finger section 301 can include three IMUs 302 (and/or three MCUs 304). In some examples, two or more (e.g., less than all) finger sections 301 can each include three IMUs 302. Additionally, the thumb section 305 can include three IMUs 302 (and/or two MCUs 304) for its three bones (e.g., the distal bone 107A, the proximal bone 107C, and metacarpal bone illustrated in FIG. 1). Additionally, one or more IMUs can be located proximate to the user's palm (e.g., metacarpal bone 107D illustrated in FIG. 1). In some instances, the finger sections 301 and the thumb section 305 can include a total of 16 or more IMUs 302.

In this manner, an IMU 302 can be located proximate to a unique finger bone and can measure the motion of that specific finger bone. In some examples, the IMU 302 can include one or more multi-axes acceleration motion sensors (e.g., an accelerometer) configured to detect acceleration in three directions. For example, the IMU 302 can be a 3-axis IMU that can detect the z-axis direction movements, the y-axis direction movements, and the x-axis direction movements. In some examples, the IMU 302 can include one or more sensors (e.g., a 3-axis gyroscope) to detect rotational movement for a total of 6 axes.

Each IMU 302 can generate a signal indicative of the measured acceleration and rotational movement of the respective finger bone and can transmit that signal to a controller such as the controller 323 via one or more signal lines or buses 322. In some examples, a bus 322 can be associated (e.g., dedicated) to a specific finger section 301 or a thumb section 305. The controller 323 can process the signals from the respective bus 322 individually to track the motion of a specific finger bone and/or can process two or more signals collectively to track the motion of the finger joint(s). The movement of a given finger can be determined based on differences in information between the given finger and another finger, for example.

The IMUs 302 can determine the acceleration and rotational movement using only accelerometers and gyroscopes to determine the pitch, roll, and yaw of the associated finger part. In some examples, the IMUs may include magnetometers. The methods for determining the locations and motions of the hand and fingers are discussed below.

Heading Correction

The VR glove 330 can include a plurality of reset electrodes 314 configured for correcting the computed finger heading. As discussed above, examples of the disclosure can include IMUs that may not include a magnetometer (e.g., due to its disadvantages such as losing direction when proximate to a magnet). In some examples, an IMU 302 can include an accelerometer. The accelerometer can be used to measure the roll and pitch (i.e., tilt) of the IMU 302 under conditions where inertial acceleration can be insignificant. Without a magnetometer, the IMU cannot correct the heading (yaw) due the lack of a reference signal perpendicular to gravity.

Examples of the disclosure can include using the reset electrodes 314 for correcting heading drift. The reset electrodes 314 can be located along one or more sides of a finger section 301 or a thumb section 305. The reset electrodes 314 can be located such that adjacent reset electrodes 314 can make electrical contact, and a signal indicative of the electrical contact can be generated. For example, a reset electrode 314 can be located on the lateral sides along the middle bones (e.g., middle bone 103B illustrated in FIG. 1) and the proximal bones (e.g., proximal bone 103C illustrated in FIG. 1) of the finger sections 301. In some examples, at least three of the four finger sections 301 can include reset electrode 314A and reset electrode 314B each located on opposite sides of the respective finger. In some examples, the pinky finger section 301 may only include one reset electrode 314B located on the side of the pinky finger section 301 closer to the ring finger section 301. In some examples, the thumb section 305 may only include one reset electrode 314A located on the side of the thumb section 305 located closer to a finger section 301 (e.g., the index finger section 301).

In some examples, adjacent reset electrodes 314 may electrically contact, but the heading should not be updated (e.g., corrected). For example, the user's fingers may be crossed. As another example, the user's finger may be flexed (e.g., index finger may be bent at a 45-90°) with respect to an adjacent finger (e.g., the middle finger). To prevent the electrical contact from causing the heading correction procedure to be executed, the system can determine the orientation of the fingers. Based on the orientation, the system may or may not proceed with the heading update.

In some examples, the reset electrode 314 can be a conductive patch. One electrode can be connected to ground, and another electrode can be coupled to a MCU 304. The reset electrode 314 can send a signal to a MCU 304, where the signal (e.g., a 1-bit signal) can be indicative of the electrode state. In some examples, a MCU 304 can send a packet of information to the controller 323, where the packet can include the electrode signal. In some examples, the reset electrodes 314 can be used for resetting the heading (discussed below).

Force Sensing

The VR glove can also include one or more force sensors 306. The force sensors 306 can be located at the fingertips of the VR glove 330, for example. A force sensor 306 can be configured to measure the amount of force applied to the surface of the sensor and can generate a signal indicative of the measured amount of force. A force sensor 306 can be coupled to a MCU 304. The MCU 304 can process the information and/or communicate the information to a controller 323. In some examples, each force sensor 306 can be coupled to a unique MCU 304. In some examples, multiple force sensors 306 can be coupled to a single MCU 304. As shown in the figure, examples of the disclosure can include one force sensor 306 and one MCU 304 configured to measure the amount of applied force for one finger (e.g., an index finger). In some examples, each finger can have a force sensor 306, and the VR glove 330 can include five force sensors 306. Although not illustrated in the figure, the VR glove 330 can include other force sensors 306. For example, one or more force sensors 306 can be located proximate to the user's palm (e.g., in the hand section 311). The force sensors 306 can be used to detect interactions between the user's finger and the real environment (e.g., the user picks up a coffee mug from the table).

In some examples, the force sensor can be a resistive force sensor. The resistive force sensor can include, for example, a bendable member (e.g., a strain gauge structure). A circuit can be placed on the bendable member and can detect changes in resistance when the member bends in response to the applied force. The amount of change in resistance can be indicative of the amount of force applied to the force sensor.

In some examples, the force sensor can be a piezoelectric force sensor. The piezoelectric force sensor can include a piezoelectric material that can generate a voltage in proportion to the amount of compression on the piezoelectric material due to the amount of force applied to the force sensor.

In some examples, the force sensor can be a capacitive force sensor. The capacitive force sensor can include a plurality of electrodes, where the distance between the electrodes can be affected by the applied force. The change in capacitance across the electrodes can be related to the distance between the electrodes. Thus, the amount of change in capacitance can be indicative of the amount of force applied to the force sensor.

In some examples, the capacitive force sensing can include a plurality of deformable electrodes where the applied force can affect the shape of the electrodes. A change in capacitance across the electrodes may be related to the shape of the electrodes, and the amount of change in capacitance can be indicative of the amount of force applied to the force sensor.

Haptic Feedback

The VR glove 330 can also include haptic feedback to produce movement in a section of the glove (e.g., a section near the fingertips) in response to certain actions. One or more drive signals can be applied to an actuator 308 located at a fingertip, and the actuator 308 can impart motion to the fingertip. For example, in MR/AR applications, the force sensors can respond to real surfaces that may have virtual objects (e.g., buttons or keys) that when pressed can invoke a signal that can trigger a haptic event. The motion from the actuator 308 can be used to simulate texture or click feedback when the user's fingers are touching virtual objects, for example.

In some examples, the actuator can include a solenoid having a barrel that can include wraps of wire. A current can be applied to the wire to create a magnetic field that can draw a magnetic plunger into the interior of the barrel. The current flow to the wire can be modulated to control the movement of the plunger, thereby imparting motion.

In some examples, the actuator can include a linear motor, a rotator motor, or another electromagnetic actuator structure. In some examples, the actuator can be formed from piezoelectric materials and other structures that can be capable of producing movement in response to an applied electrical signal.

In some examples, one or more actuators can be located proximate to the wrist section of the VR glove 330. The system can drive the actuator in response to one or more actions (e.g., the lights in the simulated environment go dark) associated with an object.

Controller

The hand section 311 can include a controller 323 (e.g., an on-board controller). The controller 323 can include one or more circuits such as a microcontroller and/or a bus controller 323. The hand controller 332 can one or more components including, but not limited to, a memory 325, a connector 327, and a transceiver 338. The memory 325 can be used for reading and/or writing information. For example, the hand reference and/or fingers reference can be stored in memory 325 (discussed below). As another example, one or more computer readable storage programs can be stored in memory 325. The connector 327 can be used to connect the VR glove 330 to one or more components (e.g., VR headset) for wired communications, for example. As another example, the connector 327 can be used to connect the VR glove 330 to a power supply to charge the onboard battery (e.g., battery 234 illustrated in FIG. 2).

The controller 323 can receive signals from the components and can process the information via the transceiver 338. In some examples, the controller 323 can send the signals (e.g., collectively) to a host device (e.g., the host device). In some examples, the controller 323 can be located entirely or partially on another portion of the VR glove 330. For example, the controller 323 can be located above the metacarpal bones on the dorsal side of the user's hand. When located on a curved surface (e.g., the dorsal side of the user's hand), the controller 323 can include a plurality of rigid sections separated by flexible sections such that the controller 323 can conform to the user's hand.

Although not shown in the figures, the VR glove 330 can include one or more accelerometers. The one or more accelerometers and/or gyrometers can be used to correct orientation when the user hands are not moving, for example. For example, an accelerometer can be used to correct any drift in roll and/or pitch (i.e., tilt) when the accelerometer is measuring gravity and not inertial acceleration.

Knitted Material

The VR glove 330 can be a knitted or woven glove where one or more (e.g., all) electronics components can be integrated into the fabric of the glove. In some examples, glove can include a fabric with multiple sections having a different number of layers. For example, sections can comprise a single layer where an electronic component may not exist. Where an electronic component (e.g., an IMU) exists, the fabric can be a two-layer fabric with a pocket that secures the electronic component between the layers. Electronic components can be respectively positioned. For example, IMUs can be located proximate to the center of a finger bone. Electronic components that can be woven into the fabric of the glove can include, but are not limited to, the IMUs, the electrodes, and the controller. In some examples, the fabric can be stitched together using conductive threads. As another example, a conductive thread, yard, or braid can be knit simultaneously with other non-conductive threads to produce the VR glove. For example, the busses 322 can be formed from conductive threads that are included at least as part of the overall knit structure. As another example, the conductive threads can electrically couple one or more components together and/or can be used for routing signals. In some instances, the buses 322 can include conductive threads.

Operation of the VR Glove

Figure 4A:
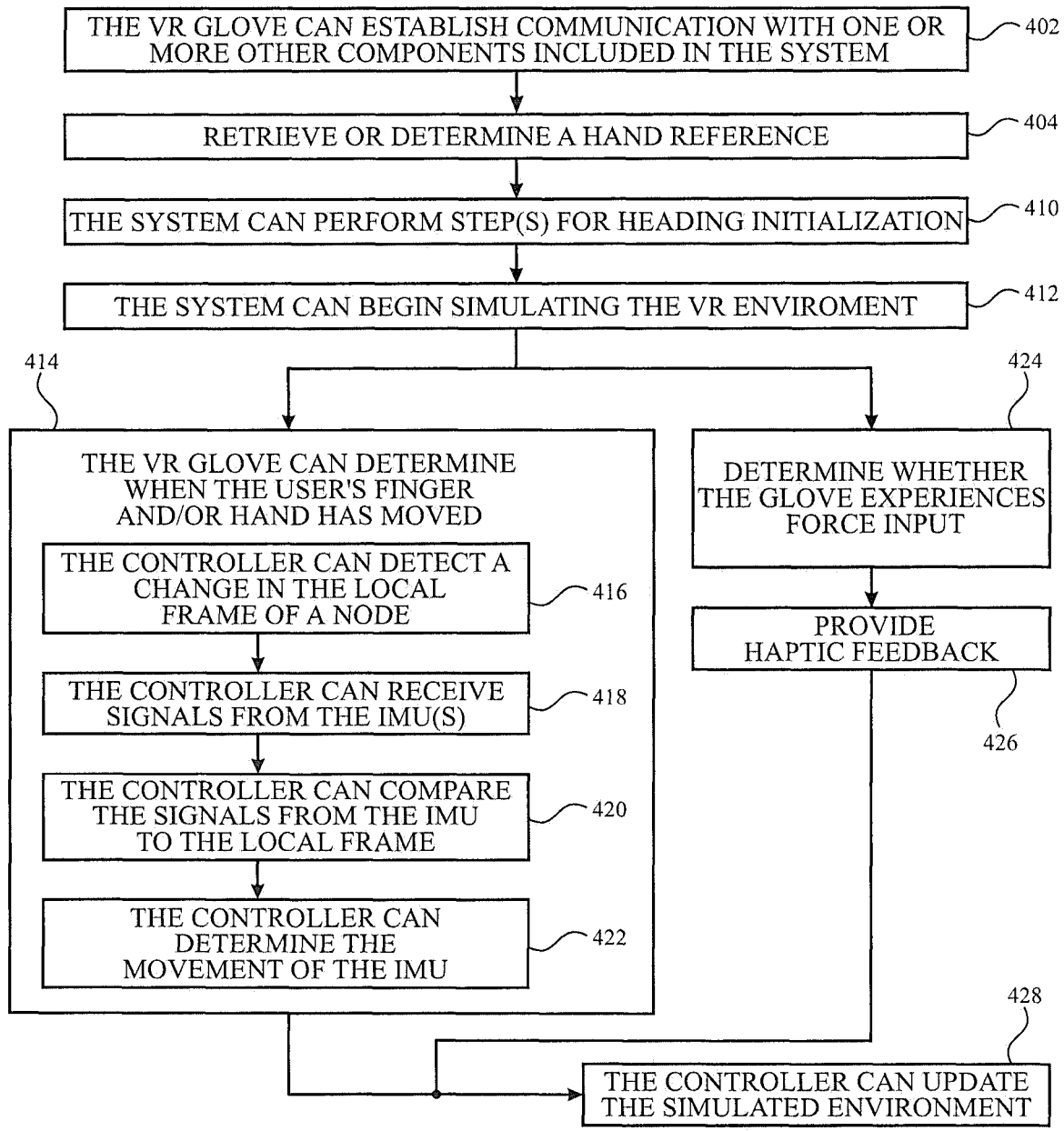
FIG. 4A illustrates an exemplary process for determining the locations and motions of the hand and fingers using a VR glove according to examples of the disclosure.

FIG. 4A illustrates an exemplary process for determining the locations and motions of the hand and fingers using a VR glove according to examples of the disclosure. The VR glove (e.g., VR glove 230 illustrated in FIG. 2) and/or one or more other components (e.g., a host device and/or a VR headset) included in the system may establish communication with one or more other components included in the system (step 402 of process 400). Establishing communication between components in the system can include utilizing one or more transceivers (e.g., transceiver 238 illustrated in FIG. 2, transceiver 338 illustrated in FIG. 3, etc.). The transceivers can communicate wirelessly using protocols such as Bluetooth or Wi-Fi. In some instances, the VR glove can establish a pairing using a wireless communication technology with a host device or the other VR glove. While the devices are paired, the host device/VR glove can send information to the VR glove, or vice versa. For example, the host device can send hand reference information (e.g., used in step 404) to the VR glove. In some examples, the glove can utilize an electrical connector (e.g., connector 327 illustrated in FIG. 3) to provide a wired connection to another component (e.g., using suitable cables).

Figure 4B:
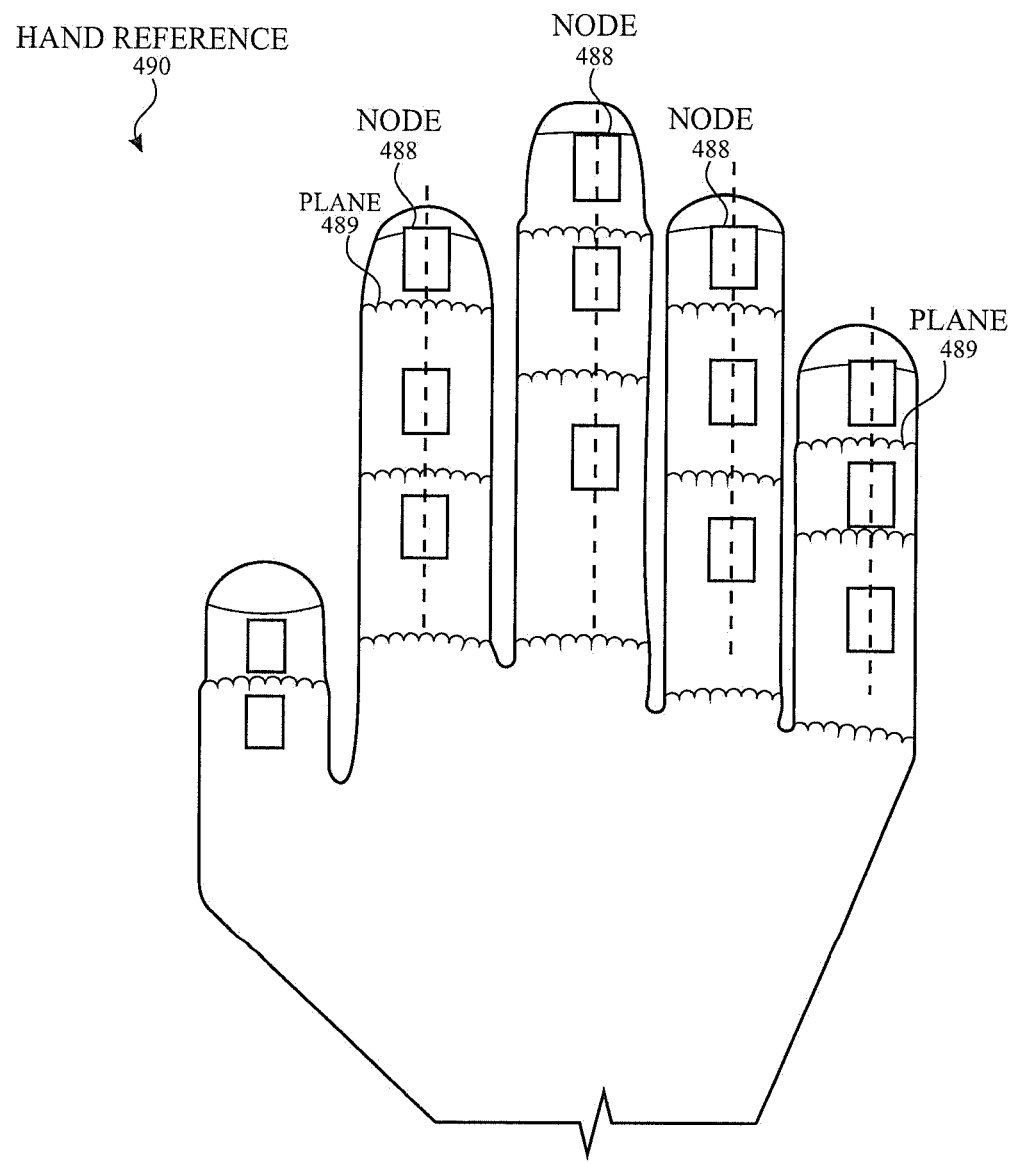
FIG. 4B illustrates an exemplary hand reference according to examples of the disclosure.

A hand reference 490 can be provided by retrieving or determining the hand reference (step 404 of process 400). An exemplary hand reference is illustrated in FIG. 4B. In some examples, the hand reference 490 can be retrieved from a library file (e.g., a file located in the memory 325 illustrated in FIG. 3).

In some examples, the hand reference 490 can be generated based on one or more measurements and/or images. For example, the host device can include an application, which can allow the user to place his or her hand on the screen of the host device (alternatively, the host device can take or receive a digital image). The application can take an image of the user's hand and can automatically determine one or more measurements (e.g., the length of one or more finger bones, distance between fingers when the user's fingers are spread out, etc.). One or more optimization and/or calibration steps can be performed to refine the measurements. Additionally, examples of the disclosure can include determining (e.g., including recording) the range of motion for the user's hand. The range of motion can be used to limit the angles of movement of the user's fingers and/or joints.

The system can perform one or more steps for hand initialization. The initialization can include determining the location and/or position of the user's hand. For example, the host device can provide instructions to the user to place his or her hand in a certain position (e.g., the palm touching a tabletop that is perpendicular to the direction of gravity). The user can place his or her hand in the specified position, the VR glove can take measurement(s) (e.g., using the IMUs) of the user's hand in that specified position, and the VR glove can set the hand reference based on the measurements. In some examples, taking measurements can include using one or more cameras (not shown) and/or one or more optical sensors (not shown) to determine the location and/or position of the user's hand. The camera(s) and/or optical sensor(s) may take measurements without a host device (or the one or more other components such as the glove) providing instructions.

The system can perform initialization of the fingers. In some examples, the host device can also provide instructions to the user to place his or her fingers in a certain position (e.g., the fingers also touching the tabletop that is perpendicular to the direction of gravity). The user can place his or her fingers in the specified position(s), the VR glove can take measurement(s) (e.g., using the IMUs, cameras, optical sensors, etc.), and the VR glove can set the hand reference including fingers reference information based on the measurements. In some examples, taking measurements to determine the fingers reference can occur simultaneously as the measurements for determining the hand reference (e.g., step 406 of process 400).

Using the hand reference information, the system can perform heading initialization (step 410 of process 400). The heading initialization step(s) can be a step(s) where the initial heading is measured and determined. In the absence of using magnetometers for the IMUs, the system may rely on other components for heading initialization and correction. The methods for heading initialization and correction are discussed below. The heading initialization steps can include determining the heading for individual finger nodes 488 on the hand reference 490 illustrated in FIG. 4B (discussed below).

Figure 4C:
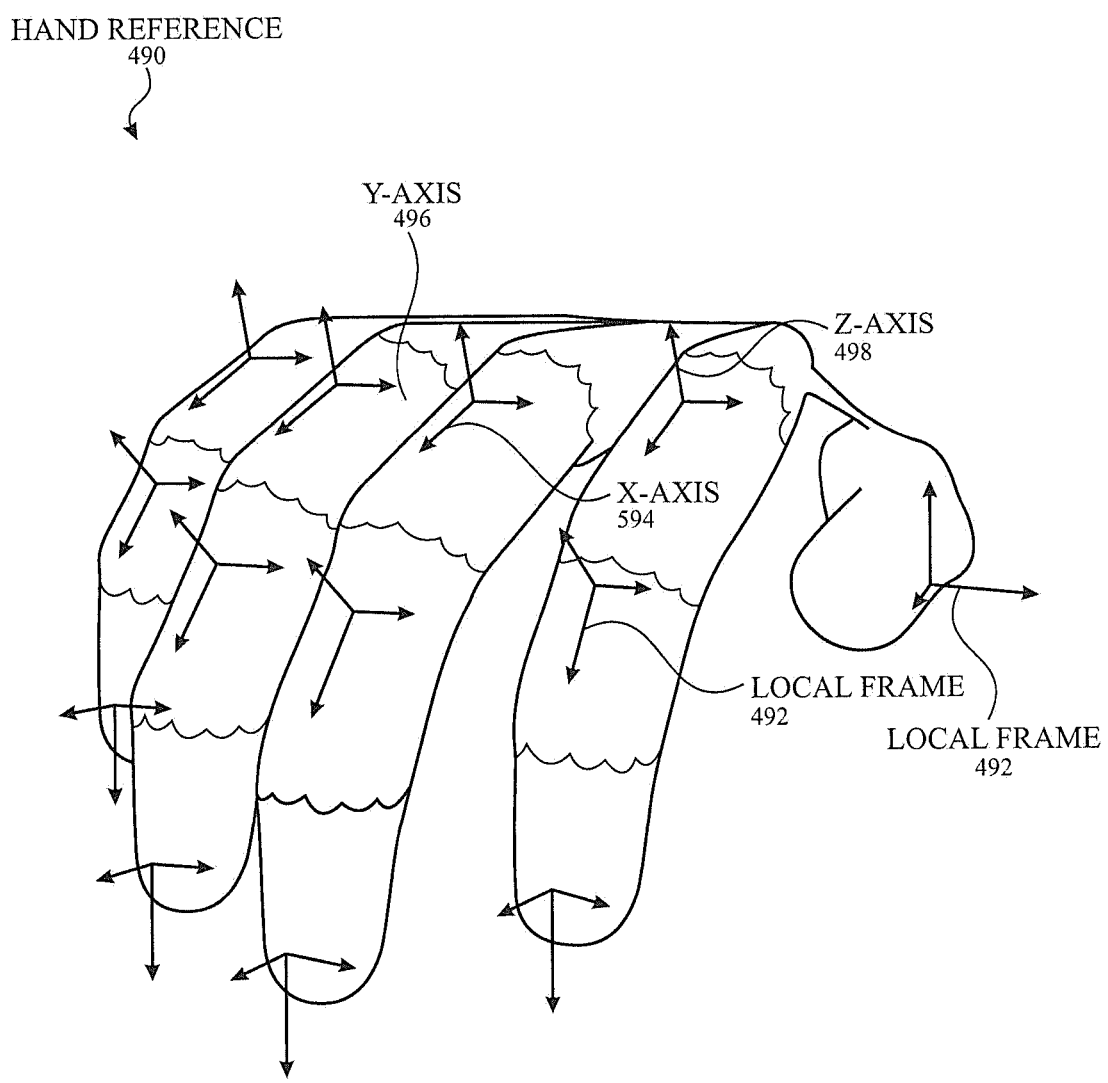
FIG. 4C illustrates exemplary local frames for a plurality of fingers and a thumb included in a hand reference according to examples of the disclosure.

Once the system has the hand reference information and the initial heading information, the system may begin simulating the VR environment with the VR glove (step 412 of process 400). The VR glove can determine when one or more fingers and/or the user's hand has moved (step 414 of process 400). The system can use the hand reference 490 as a reference to the one or more of the hand and (e.g., all of) the fingers. Each finger node 488 can have a local frame 492, as shown in FIG. 4C. Between finger nodes 488 can be a plane 489, which can be representative of a plane passing through the user's joint (e.g., at half the angle between the finger/thumb bones). The local frame 492 of a given node 488 can represent the current location and position of the IMU. The system can detect a change in the local frame (e.g., determined by a change in the signal of an IMU) of a given IMU (e.g., IMU 302 illustrated in FIG. 3) (step 416 of process 400). A controller (e.g., controller 323 illustrated in FIG. 3) can receive one or more signals, which can be indicative of the local frame 492, from the respective IMU (step 418 of process 400). The controller can compare the received signal information to the local frame of the respective IMU (step 420 of process 400). The controller can use the differences between the local frame and the hand reference to determine the movement of the IMU (step 422 of process 400). The movement of an IMU can reflect the movement of the finger bone and/or hand bone to which the IMU is located proximate to.

In some examples, the controller can receive signal information from IMUs associated with a motion and IMUs not associated with a motion. The controller can process all of the information to determine which IMUs are associated with the motion. In other examples, the controller may only receive signal information from IMUs associated with a motion. In some examples, the controller may periodically (e.g., at pre-determined time intervals) measure the signal information from one or more (e.g., all) IMUs. The signal information that the controller receives may include an indication that the IMU is associated with movement and may also include information of the acceleration, rotational rate, and direction of the movement. For example, as shown in FIG. 4C, the signal information can include information pertaining to the current position and/or change in the x-axis 494, y-axis 496, and/or z-axis 498 of a given local frame 492.

The VR glove can determine whether one or more fingers and/or other parts of the glove (e.g., the hand section 311 illustrated in FIG. 3) experiences input such as force input (step 424 of process 400). One or more force sensors (e.g., force sensors 206 illustrated in FIG. 2) can measure the amount of force applied to the surface of the sensor (as discussed earlier) (e.g., the user's fingers are touching a virtual object). In some examples, the force sensors can send one or more signals indicating that a force input was received to the controller. The one or more signals can include information about the force such as the amount of force. In some examples, the controller can periodically (e.g., at pre-determined time intervals) measure the signal information from one or more (e.g., all) force sensors. In some instances, the controller may receive signal information from all force sensors and may process information associated with a force sensor associated with force input.

Additionally, the system can determine whether to provide haptic feedback via one or more actuators (step 426 of process 400). One or more actuators (e.g., actuator 308 illustrated in FIG. 3) can impart motion to a section (e.g., a fingertip) of the glove. The controller can send one or more signals to an actuator (and/or the MCU that the actuator is coupled to) to produce the movement. In some examples, the controller can send the signals to the actuator in response to detected force input (e.g., step 424 of process 400).

The controller (e.g., controller 323 illustrated in FIG. 4 and/or a controller located on a VR headset) can transmit and/or receive information associated with the motions of steps 414-426 and can update the simulated environment (step 428 of process 400). In some examples, one or more other components (e.g., cameras, optical sensors, the reset electrodes 214 illustrated in FIG. 2) can be provide the same and/or additional information related to one or more the user's hand movement, location, and position. As discussed below, during or between one or more of the steps illustrated in FIG. 4, the system can undergo steps for heading correction.

Heading Initialization

Without a magnetometer, the initial headings of each IMU may be determined using other methods and components. One or more steps can be performed for heading initialization (e.g., step 410 of process 400 illustrated in FIG. 4). For example, the VR glove can use an x-rotation optimizer and/or a y-rotation optimizer.

Figure 5:
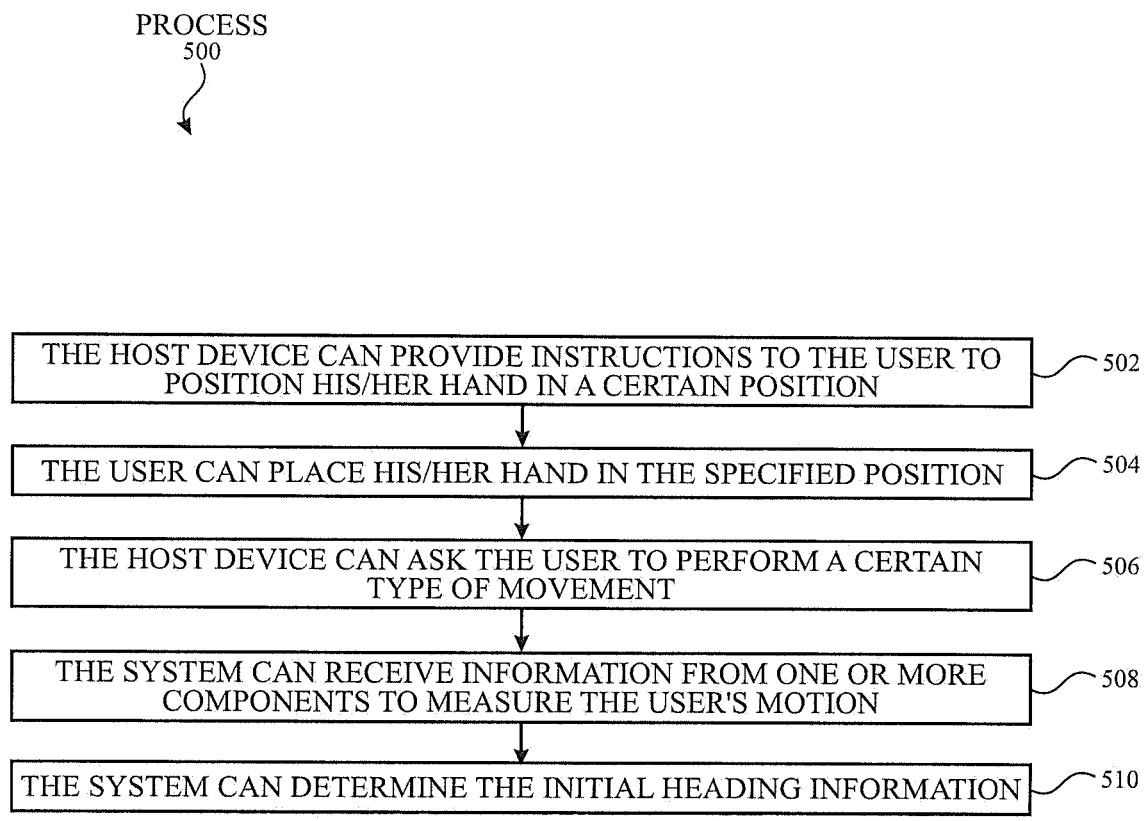
FIG. 5 illustrates an exemplary process for determining the initial heading using an x-rotation optimizer according to examples of the disclosure.

FIG. 5 illustrates an exemplary process for determining the initial heading using a rotation optimizer according to examples of the disclosure. Process 500 can begin with the host device providing instructions to the user to position his or her hand in a certain position (step 502). For example, the instructions can ask the user to position his or her hand such that the palm can be perpendicular to gravity (e.g., the user's palm can be facing the screen of the host device), referred to as an x-optimizer. The user can place his or her hand in the specified position (step 504 of process 500). The instructions can ask the user to perform a certain type of movement (step 506 of process 500). For example, the instructions can ask the user to rotate his or her hand about the x-axis (e.g., waving goodbye). The system can receive information from one or more components included in the VR glove to measure the user's motion (e.g., using one or more IMUS such as IMU 302 illustrated in FIG. 3) (step 508 of process 500). The system can use the measured motion information to determine the initial heading information (step 510 of process 500).

In some examples, the VR glove can use a y-rotation optimizer to determine the initial heading information. With the y-rotation optimizer, the instructions can ask the user to position his or her hand in a certain position (e.g., step 502). For example, the instructions can ask the user to place his or her palm on a tabletop perpendicular to the direction gravity with his or her fingers touching each other. The user can place his or her hand in the specified position (e.g., step 504). The instructions can ask the user to perform a certain type of movement (e.g., step 506). For example, the instructions can ask the user to rotate his or her hand about the y-axis such as rotating the hand 90 degrees to place the local frame x-axis parallel to the direction of gravity (e.g., with the thumb finger pointing up). One or more accelerometers can be used to determine the initial heading.

Heading Correction

Figure 6A:
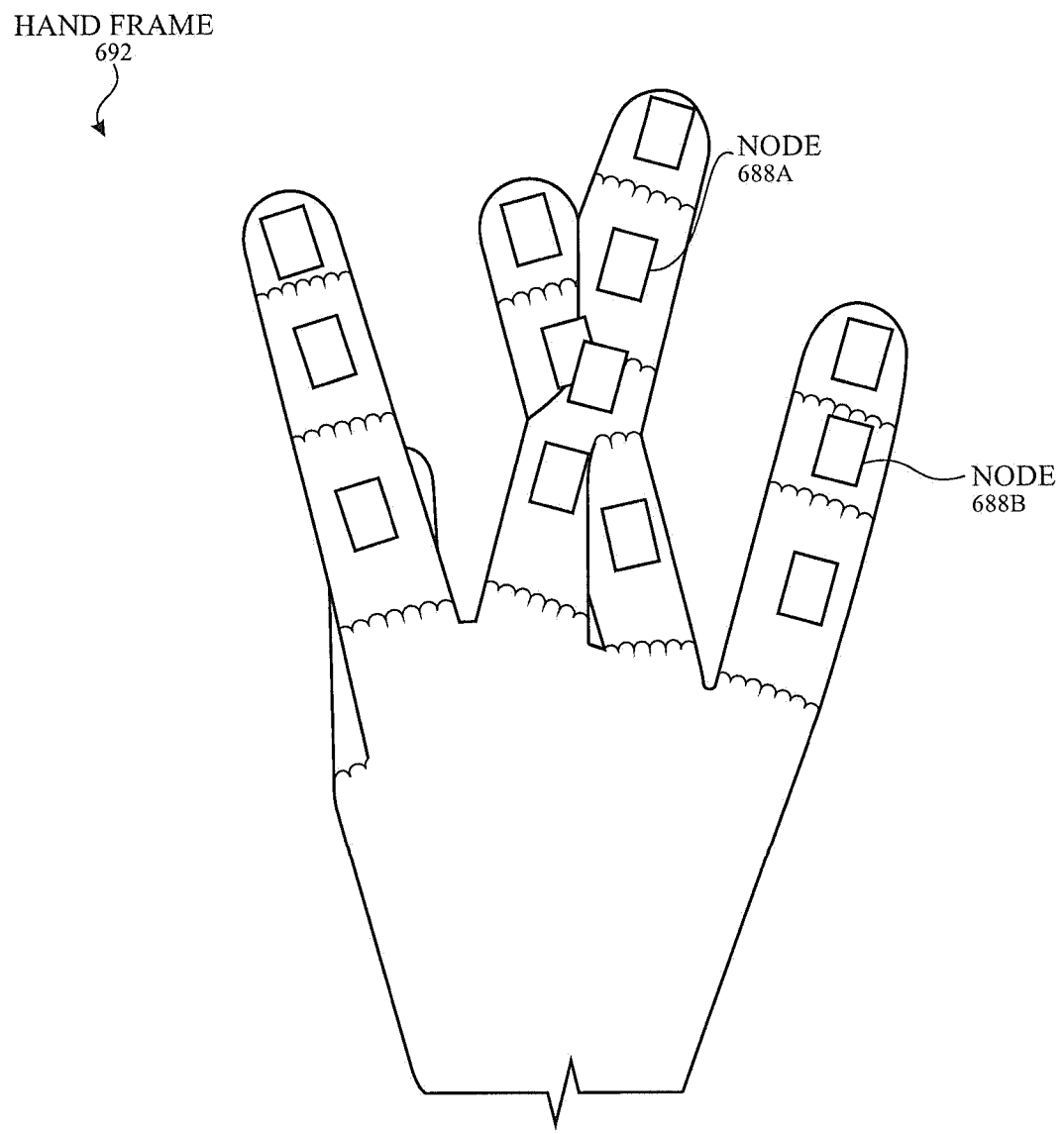
FIG. 6A illustrates an exemplary collision of two or more fingers according to examples of the disclosure.

Without a reliable heading reference, the headings of each computed finger position may drift independently of each other, leading to inaccuracies in determining the movement, location, and position (e.g., steps 414-422 illustrated in FIG. 4). The system can correct the drift in order to reduce or prevent such inaccuracies. Since the drift in each finger may be independent, the fingers can either drift towards each other or away from each other. If two adjacent fingers drift in opposite directions, they may eventually collide. One way to correct this drift can be by detecting the collision of the rendered fingers. FIG. 6A illustrates an exemplary collision of two computed fingers positions according to examples of the disclosure. The process can begin by determining whether two or more fingers have collided into each other in the simulated space. As discussed above, the heading orientation of the finger nodes 608 can be determined during the heading initialization step(s) (e.g., step 410 of process 400 illustrated in FIG. 4). For example, the user's fingers may be splayed apart in real space, but the system may incorrectly determine that the user's fingers are touching or crossing over each other in the simulated space, as shown. For example, the fingers in the simulated space may be colliding (not shown) and/or one or more finger nodes, such as finger node 688A and the finger node 688B, in the hand frame 692 (in the simulated space) may be colliding. The drift can be corrected by (e.g., using a host device) moving the heading of one or more nodes 688 to move apart until they are no longer colliding in the simulated space.

Figure 6B:
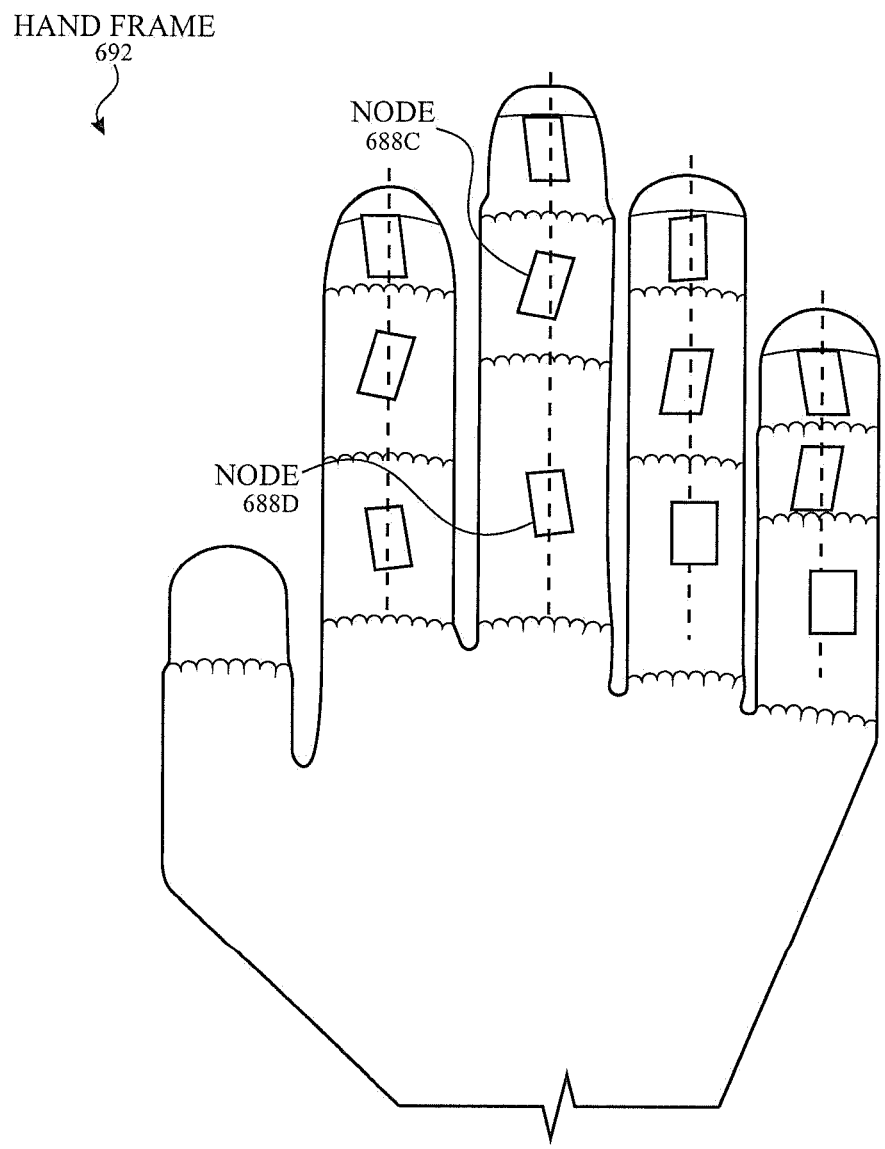
FIG. 6B illustrates exemplary rotations of two or more nodes according to examples of the disclosure.

Additionally or alternatively, the heading of one or more nodes, such as the finger node 688C, can be rotated away from the heading of another node, such as the finger node 688D, located on the same finger, as illustrated in FIG. 6B. In some examples, the system can determine whether the heading for a finger has drifted in the simulated space by comparing the heading of the node 688 associated with a proximal bone (e.g., proximal bone 103C illustrated in FIG. 1). Correcting the heading of a finger can include modifying the heading of the node 688 associated with a proximal bone in the simulated space. The system can determine whether the heading for a finger node has drifted by comparing the heading of the node 688 associated with the middle bone (e.g., middle bone 103B illustrated in FIG. 1) and the distal bone (e.g., distal bone 103A illustrated in FIG. 1) to the heading of the node 688 associated with the proximal bone. Correcting the heading of the nodes 688 associated with the middle bone or the distal bone can include corrections with respect to the heading of the node 688 associated with the proximal bone. That is, for a given finger, the nodes of the proximal bone, middle bone, and distal bone in the simulated space should be aligned when the user's finger is extended in real space.

Another way to correct the drift can be by using the heading reset electrodes (e.g., reset electrodes 214 illustrated in FIG. 2). When adjacent fingers touch in real space, the electrodes can electrically couple together. If adjacent fingers are touching in real space, but the system incorrectly determines that the user's fingers are splayed apart (or vice versa) in the simulated space, then the system can execute one or more heading correction steps. For the touching fingers in real space, the system can determine the average of the headings of the touching fingers and set the headings of the fingers in the simulated space equal to the determined average.

In some examples, one or more other components (e.g., rotation sensor, camera, optical sensors, etc.) can be used, additionally or alternatively, to initiate the drift correction process and/or for correcting the drift. For example, a camera can determine which fingers the system should correct the drift for based on the position of the fingers in real space. The camera (e.g., included in a VR headset) could take images of the user's fingers and can check whether the orientation of the fingers in the images differ from the system's simulation. Additionally or alternatively, the camera can be used to track the position(s) of the user's hand(s).

A glove included in a virtual realty system and configured to be worn over a hand of a user, the glove comprising: one or more electronic components including: a plurality of inertial motion units (IMUs), each IMU located proximate to a hand or finger bone and configured to generate a signal indicative of a motion of the hand or finger bone, wherein the plurality of IMUs are configured to measure an acceleration and a rotational rate of one or more of the hand and fingers of the user; and logic configured to: determine one or more movements of a joint of the user using the signals, and determine one or more movements of a finger of the user. Additionally or alternatively, in some examples, the glove excludes a magnetometer. Additionally or alternatively, in some examples, at least two of the plurality of IMUs is located proximate to the finger bones belonging to the same hand or finger, the glove further comprising: one or more buses including at least one bus configured to receive the signals from the at least two of the plurality of IMUs, wherein the determination of the one or more movements of the finger of the user includes using the received signals. Additionally or alternatively, in some examples, each of the one or more buses is associated with a separate finger, and wherein the determination of the one or more movements of the finger of the user includes receiving separate signals from each of the one or more buses. Additionally or alternatively, in some examples, the glove further comprises a plurality of finger sections and a thumb section; and a plurality of electrodes, each electrode located on a side of a finger section or a thumb section, wherein the logic is further configured to: generate a second signal when two of the plurality of electrodes makes electrical contact. Additionally or alternatively, in some examples, one finger section includes only one electrode, and the thumb section includes only one electrode. Additionally or alternatively, in some examples, the glove further comprises: a plurality of finger sections and a thumb section; and one or more force sensors configured to determine whether a force is applied and located proximate to tips of at least one of the plurality of finger sections, the thumb section, or both. Additionally or alternatively, in some examples, the glove further comprises: a plurality of finger sections and a thumb section; and a plurality of actuators configured to vibrate tips of at least one of the plurality of finger sections, the thumb section, or both. Additionally or alternatively, in some examples, the glove further comprises: knitted material including at least one of the one or more electronic components. Additionally or alternatively, in some examples, the knitted material includes: one or more first sections including a plurality of layers surrounding the at least one of the one or more electronic components, and one or more second sections including a single layer. Additionally or alternatively, in some examples, the glove further comprises: one or more conductive threads configured as knitted threads within the knitted material. Additionally or alternatively, in some examples, the glove further comprises: a plurality of microcontroller units (MCUs), wherein each IMU is coupled to a unique MCU. Additionally or alternatively, in some examples, a number of the plurality of IMUs is greater than or equal to 16. Additionally or alternatively, in some examples, the logic is included in an on-board controller.

A method for operating a virtual reality system is disclosed. The method can comprise: establishing a communication with one or more devices, the one or more devices including a glove; retrieving or determining a hand reference, wherein the hand reference includes a plurality of finger frames, each finger frame indicative of a position of a node; and one or more of: detecting a movement of each of a plurality of IMUs based one or more signals indicative of an acceleration and a rotation of the respective IMU, and determining whether one or more finger sections, a thumb section, or both experience an applied force. Additionally or alternatively, in some examples, the detection of the movement of each of the plurality of IMUs includes: comparing the one or more signals to at least one finger frame. Additionally or alternatively, in some examples, the determination of a hand reference includes initializing a heading comprising: providing a first instruction to a user to position a hand of the user along a given axis relative to gravity; and providing a second instruction to the user to move the hand about the given axis. Additionally or alternatively, in some examples, the method further comprises: correcting a drift in a heading by detection a collision of at least two of the nodes. Additionally or alternatively, in some examples, the method further comprises: correcting a drift in a heading by detecting a difference in rotations of at least two of the nodes, wherein the at least two of the nodes are associated with the same finger or thumb section. Additionally or alternatively, in some examples, the method further comprises: receiving a second signal indicative of two electrodes making electrical contact; and correcting a drift in a heading when the second signal is received. Additionally or alternatively, in some examples, the method further comprises: providing a vibration to at least a portion of the determined one or more finger sections, the thumb section, or both.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. A glove configured to be worn over a hand of a user, the glove comprising:
   a plurality of electronic components including:
      a plurality of inertial motion units (IMUs), each IMU located proximate to a hand section or a finger section of the glove and configured to generate one or more first signals indicative of a motion of the hand or a finger of the user, and
      a plurality of reset sensors located proximate to a plurality of finger sections of the glove;
   wherein the plurality of IMUs are configured to measure an acceleration and a rotational rate of one or more of the hand and fingers of the user;
   wherein the plurality of reset sensors are configured to generate one or more second signals indicative of electrical contact between at least two of the plurality of reset sensors; and
   logic configured to:
      determine one or more movements of a joint of the hand of the user using the first signals,
      determine one or more movements and headings of one or more fingers of the user using the first signals from at least two of the plurality of IMUs associated with the one or more fingers,
      determine which of the one or more fingers are touching based on the one or more second signals; and
      correct the headings of the touching fingers based on the one or more second signals.

2. The glove of claim 1, wherein the glove excludes a magnetometer.

3. The glove of claim 1, further comprising:
   plurality of buses comprising:
      a first bus including the first signals from at least two IMUs located in a first finger of the glove, and
      a second bus including the first signals from at least two IMUs associated with a second finger of the glove,
   wherein the determination of the one or more movements and headings of the one or more fingers of the user includes using differences in information between the first signals of the first bus and the first signals of the second bus.

4. The glove of claim 1, further comprising:
   a thumb section;
   wherein each of the plurality of reset electrodes are located on a side of a finger section or a thumb section.

5. The glove of claim 4, wherein one finger section includes only one electrode, and the thumb section includes only one electrode.

6. The glove of claim 1, further comprising:
   a thumb section;
   wherein at least one force sensor is proximate to the thumb section and configured to determine whether a force is being applied to the thumb section of the glove.

7. The glove of claim 1, further comprising:
   a plurality of actuators configured to vibrate tips of at least one of the plurality of finger sections.

8. The glove of claim 1, further comprising:
   knitted material including one or more of the plurality of electronic components.

9. The glove of claim 8, wherein the knitted material includes:
   one or more first knitted material sections including a plurality of layers surrounding the one or more electronic components, and
   one or more second knitted material sections including a single layer.

10. The glove of claim 8, further comprising:
    one or more conductive threads configured as knitted threads within the knitted material.

11. The glove of claim 1, further comprising:
    a plurality of microcontroller units (MCUs), wherein each IMU is coupled to a unique MCU.

12. The glove of claim 1, wherein a number of the plurality of IMUs is greater than or equal to 16.

13. The glove of claim 1, wherein the logic is included in an on-board controller.

14. The glove of claim 13, the controller configured to:
    compute an average of the headings of the touching fingers; and
    set the headings of the touching fingers to the computed average.

15. The glove of claim 13, the controller configured to:
    determine an orientation of each of the touching fingers; and determine whether to correct the headings of the touching fingers based on the orientations of each of the touching fingers.

\* \* \* \* \*

UNITED STATES PATENT AND TRADEMARK OFFICE
CERTIFICATE OF CORRECTION

PATENT NO.        : 10,877,557 B2
APPLICATION NO.   : 16/115367
DATED             : December 29, 2020
INVENTOR(S)       : John Greer Elias et al.

Page 1 of 1

It is certified that error appears in the above-identified patent and that said Letters Patent is hereby corrected as shown below:

In the Claims

In Column 16, Line 12, in Claim 3, before "plurality" insert --a--.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*